Aug. 4, 1970    R. W. SWEET    3,522,849
FLEXIBLE CONNECTING MEANS BETWEEN ADJACENT AGRICULTURAL
IMPLEMENT SECTIONS OF THE DISC CULTIVATOR TYPE
Filed March 25, 1968

INVENTOR
RALPH. W. SWEET
BY
ATTORNEY

United States Patent Office 3,522,849
Patented Aug. 4, 1970

3,522,849
FLEXIBLE CONNECTING MEANS BETWEEN ADJACENT AGRICULTURAL IMPLEMENT SECTIONS OF THE DISC CULTIVATOR TYPE
Ralph W. Sweet, Forgan, Saskatchewan, Canada
Filed Mar. 25, 1968, Ser. No. 715,673
Int. Cl. A01b 49/00
U.S. Cl. 172—314    7 Claims

ABSTRACT OF THE DISCLOSURE

A flexible connection between adjacent disc cultivator sections or the like which includes a front wheel assembly to which the rear end of the tail beam of the forward section can be connected by a ball joint thus giving flexible control in many planes to this point of connection and at the same time permitting limited adjustment of the rolling direction of the front wheel assembly.

---

This invention relates to new and useful improvements in universal type connections between adjacent sections of disc cultivators and the like.

It is desirable to provide a flexible connection between adjacent sections which not only allows for turning right and left, but also permits flexible articulation in a universal manner, due to uneven ground or the like.

It is also desirable to have some means for levelling one section with another so that the depth of penetration of the discs is similar.

It is also desirable to permit the horizontal relationship between adjacent sections to be varied over a relatively wide range not only for right and left-hand turning, but also to facilitate the moving of the sections from the working to the transport position and vice-versa.

The present device overcomes disadvantages of existing structures by providing a connection which is universal within limits, permits easy vertical adjustment between adjacent sections, permits full flexibility in left and right-hand turning, and permits the device to be moved from transport position to field working position and vice-versa, readily and easily.

With the foregoing considerations in view, and such other objects, purposes or advantages as may become apparent from consideration of this disclosure and specification, the present invention consists of the invention concept which embraces or includes the method, process, construction, arrangement of parts, or new use of any of the foregoing, as herein particularly exemplified in one or more specific embodiments of such concept, reference being had to the accompanying figures in which.

In the drawings like characters of reference indicate corresponding parts in the different figures.

Figure 7:
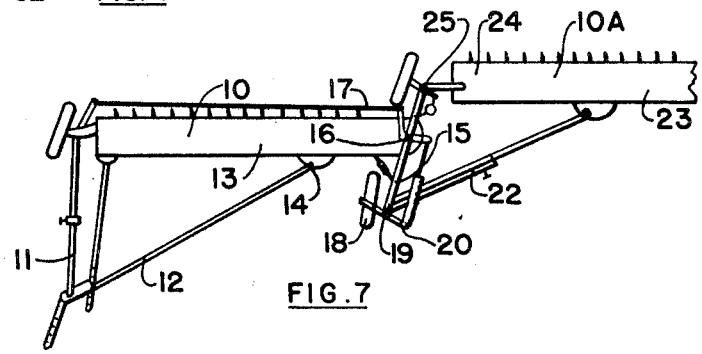
FIG. 7 is a top plan partially schematic view showing two adjacent cultivator sections.

Proceeding therefore to describe the invention in detail, reference should first be made to FIG. 7 in which a pair of cultivator sections 10, 10A are shown, it being understood that there can be two, three or more sections connected together. The first section 10 is provided with conventional draft assembly 11, extending to diagonal beam 12 which in turn is secured to the main beam 13 of the first section 10 at point 14.

However, it will be appreciated that different forms of diagonal beam construction can be utilized.

The first section 10 is provided with a tail beam 15 pivoted between the ends thereof by vertical pivot 16, to the adjacent end 17 of the main beam 13 of the first section 10.

A front ground engaging wheel 18 is secured to the front end 19 of the tail beam 15 in the conventional manner and is positioned by means of cross brace 20, adjustable to tail beam 15 or by conventional mechanical Ackerman steering from draft assembly 11 and telescopic assembly 22 extending to the main beam 23 of the second section 10A, all of which is conventional.

It will be noted that the front end 24 of the second section 10A is hooked or secured to the rear end 25 of the tail beam 15 of the first section 10 and it is this hooking up or connection at 25 which is the subject matter of the present invention and which is shown in detail in the remainder of the drawings.

Extending upwardly from the front end 24 of the second section 10A is a connecting beam or arm 26 which curves over to a horizontal portion 27 which in turn is connected to supporting structure 28. Movable vertically within the end 29 of the horizontal portion 27, is a mounting post 30 which is provided with a wheel hub 31 extending to one side of the lower end thereof, upon which ground engaging wheel 32 is supported for rotation in the conventional manner.

Means are provided to adjust the relationship of the front end 24 of the second section 10A relative to the wheel 32. This takes the form of a screw-threaded crank 33 screw-threadably engaging nut 34 secured to the upper end of the supporting structure 28. The lower end of the screw-threaded crank 33 engages the upper end 35 of the mounting post 30 thus permitting the raising and lowering of the connecting beam 26, within limits.

Figure 1:
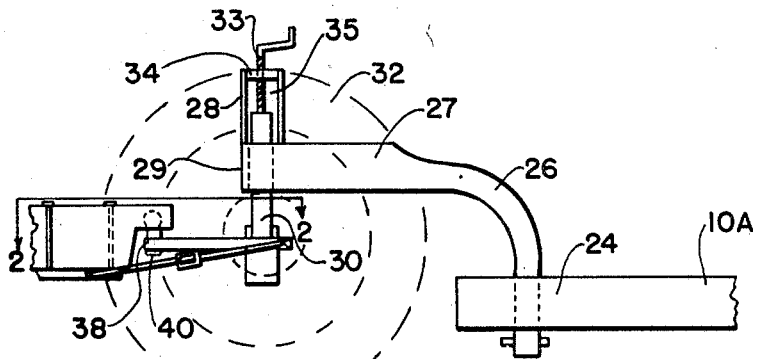
FIG. 1 is a fragmentary side elevation showing the connection of the rear end of a tail beam of one cultivator section to a second or following cultivator section.
Figure 2:
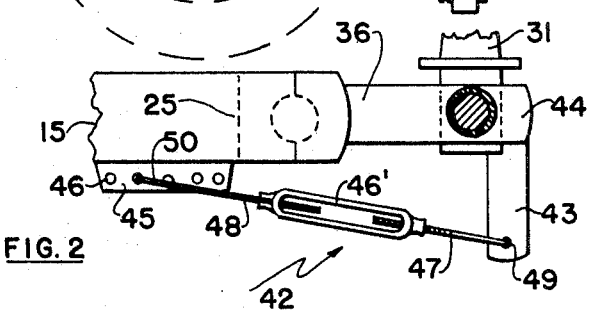
FIG. 2 is a fragmentary sectional view substantially along the line 2—2 of FIG. 1.
Figure 3:
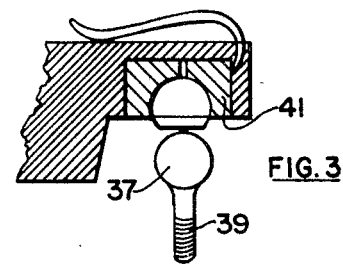
FIG. 3 is a cross sectional enlarged view of the ball joint connection of FIGS. 1 and 2.

In the embodiment shown in FIGS. 1, 2 and 3, an apertured plate 36 engages over the mounting post 30 and is welded thereto adjacent the lower end of the post. This plate extends from the post at right angles thereto and is provided with a mounting ball 37 on the distal end 38 thereof. This ball is provided with a screw-threaded stem 39 engageable through an aperture within plate 36 and secured thereto by means of nut 40.

The end 25 of the tail beam 15 of the first section is provided with a ball joint cup means 41 selectively engageable will ball 37. I have found it easiest to provide a conventional trailer hitch type cup means secured to the end 25 of the tail beam thus enabling adjacent cultivator sections to be connected and disconnected together readily and easily.

It is necessary to be able to maintain the rolling direction of travel of the ground engaging wheel 32, in the desired direction within limits and in this regard I have provided linkage means collectively designated 42. A bracket or plate 43 is also secured to the inner end 44 of the plate 36 and extends outwardly at right angles thereto.

An apertured portion 45 is secured to the side of the end 25 of the tail beam and a plurality of apertures 46 are provided.

Linkage means 42 take the form of a turnbuckle assembly 46' having rods 47 and 48 extending outwardly from each end thereof. Rod 47 is hooked to an aperture 49' within the end of plate 43 and rod 48 is hooked by the end 50 thereof, into any one of the apertures 46 in the portion 45.

The two sections can articulate in the horizontal plane by the movement of the end 29 of the connecting beam 26, around mounting post 30 and the sections can move in a universal manner within limits around the ball joint connection 37 and 41 due to the fact that the linkage means 42 is hooked to plate 43 and to portion 45 and permits this articulated movement within limits whereas a solid link here would prevent same.

Figure 4:
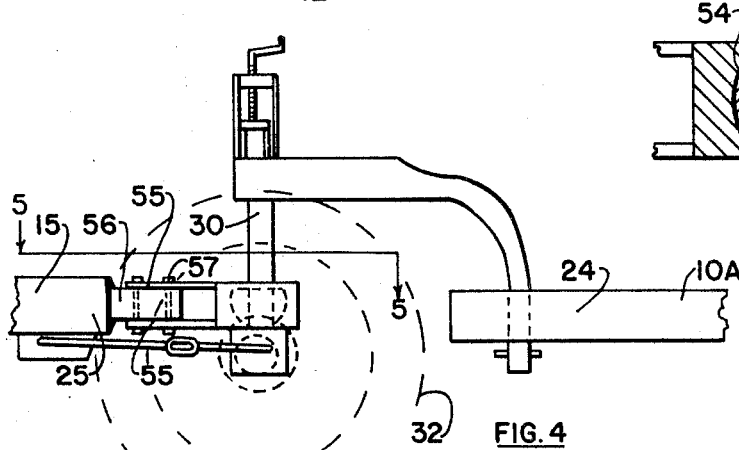
FIG. 4 is a fragmentary side elevation showing an alternative connection between the rear end of one tail beam of one section to the following section.
Figure 6:
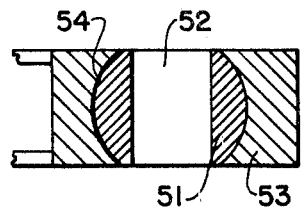
FIG. 6 is an enlarged cross sectional view of the ball joint connection of FIGS. 4 and 5.
Figure 5:
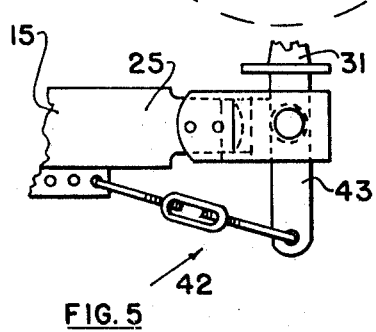
FIG. 5 is a plan view substantially along the line 5—5 of FIG. 4.

FIGS. 4, 5 and 6 show an alternative method of connection differing slightly from the first embodiment hereinbefore described. It will be noted that the axis of universal articulation through ball 37 is spaced from and parallel to the vertical axis of the mounting post 30.

However, in the embodiment shown in FIGS. 4, 5 and 6, these axes are coincident.

The mounting post 30 and connecting structure to the section 10A are similar to that hereinbefore described and have therefore been given similar reference characters.

However, the connection of the rear end 25 of the tail beam 15 is slightly different and is shown in detail. A substantially spherical ball 51 is vertically apertured as at 52 so that it can be slipped over post 30 and engage the lower end thereof where hub 31 extends from the post. This ball can either be free on the post or can be welded as desired.

Surrounding this ball is a mounting ball spherical bearing assembly 53. This spherical bearing assembly consists substantially of a block having a substantially spherical interior recess 54 which is adapted to surround and engage the ball 51. It will be appreciated that this bearing assembly has to be split for assembly purposes, but once assembled can either be bolted or welded to enclose the ball 51.

This bearing assembly is connected to the end 25 of the tail beam by means of a pair of spaced and parallel plates 55 extending from one side of the bearing assembly 53, said plates engaging a lug 56 extending from the end of the tail beam and being secured thereto by means of bolts 57.

An offstanding plate 43 extends from the lower end of the mounting tube 30 and corresponding linkage 42 maintains the rolling direction of the wheel 32 as hereinbefore described. In this embodiment, the universal action within limits takes place around the vertical axis of the mounting tube 30 and is again permitted by the construction and attachment of linkage 42, the ends of which hook loosely into the apertures 46 and 49.

Either method of attachment described in the two embodiments permits readily attachment and disconnecting of adjacent sections with wheel 32 remaining with the second section so that a conventional hitch assembly can readily be connected to utilize the second section as a single component or unit.

Also, due to the flexibility of the connection, movement to transport position and vice-versa is facilitated.

What is claimed to be the present invention is:

1. In a cultivator, the combination of at least two movably connected cultivator sections disposed in echelon formation wherein the first section has its rear end adjacent the front end of the second section, a tail beam provided on the rear end of the first section, and a wheeled draft assembly movably connecting said tail beam to the front end of the second section, said draft assembly comprising a substantially vertical post, a ground engaging wheel provided at the lower end of said post, mounting means including a ball and socket joint connecting the lower end portion of the post to said tail beam, and an arm extending from said post to the front end of said second section.

2. The device as defined in claim 1 together with vertically adjustable means connecting said arm to said post.

3. The device as defined in claim 1 wherein said ball and socket joint of said mounting means is spaced horizontally from the axis of said post.

4. The device as defined in claim 1 wherein said ball and socket joint of said mounting means is located on the axis of said post.

5. The device as defined in claim 1 wherein said mounting means also include an elongated plate having said post provided at one end thereof, said ball and socket joint being provided at the other end of said plate and connecting the same to said tail beam.

6. The device as defined in claim 1 wherein said mounting means also include a plate secured to said tail beam, the socket portion of said joint being carried by said plate and the ball portion of said joint being provided on said post.

7. The device as defined in claim 1 wherein said post is rotatable relative to said mounting means and to said arm, together with means for steering said ground engaging wheel, said steering means including a lever secured to and projecting laterally from said post, and adjustable linkage means connecting said lever to said tail beam.

References Cited

UNITED STATES PATENTS

| 619,925 | 2/1899 | Arft et al. | 172—680 |
|---|---|---|---|
| 845,082 | 2/1907 | Hendon | 172—310 |
| 976,721 | 11/1910 | Clay | 172—680 |
| 1,046,621 | 12/1912 | Mason | 172—680 X |
| 1,232,661 | 7/1917 | Davis et al. | 172—310 |
| 2,060,196 | 11/1936 | Goodman | 280—411.3 |
| 2,081,083 | 5/1937 | Beebe | 280—411.3 |
| 2,590,158 | 3/1952 | D'Artenay | 172—314 X |
| 2,669,171 | 2/1954 | Silver et al. | 172—507 X |
| 2,859,677 | 11/1958 | Vincent | 172—680 X |
| 1,012,220 | 12/1911 | Pearson. | |
| 1,054,885 | 3/1913 | Weiler | 172—314 X |

FOREIGN PATENTS

| 645,292 | 7/1962 | Canada. |
|---|---|---|
| 544,438 | 2/1932 | Germany. |

ROBERT E. PULFREY, Primary Examiner

A. E. KOPECKI, Assistant Examiner

U.S. Cl. X.R.

172—677; 280—411